United States Patent [19]

Mansfield

[11] Patent Number: 4,761,170
[45] Date of Patent: Aug. 2, 1988

[54] METHOD FOR EMPLOYING PLASMA IN DEHYDRATION AND CONSOLIDATION OF PREFORMS

[75] Inventor: Robert J. Mansfield, Stow, Mass.

[73] Assignee: Polaroid Corporation, Cambridge, Mass.

[21] Appl. No.: 45,200

[22] Filed: May 5, 1987

Related U.S. Application Data

[63] Continuation of Ser. No. 746,742, Jun. 20, 1985, abandoned.

[51] Int. Cl.$^4$ .................... C03B 19/09; C03B 23/20; C03C 27/00
[52] U.S. Cl. ...................... 65/18.2; 65/18.4; 65/900
[58] Field of Search ............... 65/3.11, 3.12, 13, 18.2, 65/18.3, 18.4, 144, 900

[56] References Cited

U.S. PATENT DOCUMENTS

| Re. 30,635 | 6/1981 | Kuppers et al. | 427/38 |
|---|---|---|---|
| 3,806,570 | 4/1974 | Flamenbaum et al. | 264/66 |
| 3,933,454 | 1/1976 | DeLuca | 65/3.12 |
| 4,082,420 | 4/1978 | Shiraishi et al. | 350/96.31 |
| 4,179,596 | 12/1979 | Bjork | 65/900 |
| 4,217,027 | 8/1980 | MacChesney et al. | 350/96.3 |
| 4,251,251 | 2/1981 | Blankenship | 65/3.12 |
| 4,262,035 | 4/1981 | Jaeger et al. | 427/39 |
| 4,263,031 | 4/1981 | Schultz | 65/3.12 |
| 4,292,063 | 9/1981 | Abe | 65/3.12 |
| 4,331,462 | 5/1982 | Fleming, Jr. et al. | 65/3.12 |
| 4,360,371 | 11/1982 | Blankenship et al. | 65/3.12 |
| 4,402,720 | 9/1983 | Edahiro et al. | 65/3.12 |
| 4,405,655 | 9/1983 | Tuln | 427/38 |
| 4,440,556 | 4/1984 | Oh et al. | 65/2 |
| 4,440,558 | 4/1984 | Nath et al. | 65/3.12 |
| 4,441,788 | 4/1984 | Goerder et al. | 350/96.34 |
| 4,533,378 | 8/1985 | Paek et al. | 65/3.12 |

Primary Examiner—David L. Lacey
Assistant Examiner—Michael K. Boyer
Attorney, Agent, or Firm—Francis J. Caufield

[57] ABSTRACT

There is disclosed use of a plasma for consolidating and/or dehydrating a glass soot preform. A plasma is struck in a vessel and the preform is inserted thereinto for effecting treatment of the preform.

7 Claims, 1 Drawing Sheet

METHOD FOR EMPLOYING PLASMA IN DEHYDRATION AND CONSOLIDATION OF PREFORMS

This application is a continuation, of application Ser. No. 746,742, filed 6-20-85 now abandoned.

BACKGROUND OF THE INVENTION

The present invention relates broadly to a method of and apparatus for treating an article in a plasma and, more specifically, to an improved method of and apparatus for dehydrating and/or consolidating glass soot for use in fabricating optical fibers.

It is recognized generally that optical fibers are a superior medium of communication. For example, optical fibers are smaller and lighter than copper wires. More importantly, a single fiber can carry hundreds of times more information than a simple metal wire can. Hence, compactness and high rates of transmission are commercially important features of a fiber optic system. However, fiber optic systems have yet to approach the cost-performance characteristics of copper systems. For fiber optic technology to become successful commercially it must be produced at a competitive price. Therefore, fabricating low cost optical fibers is key to providing a mass market for them.

Aside from cost considerations, another significant problem is quality. A major problem in the fabrication of optical fibers, especially of the type intended for long distance transmission, is to minimize optical losses to commercially acceptable levels. The purity required for achieving such low loss is achieved by sophisticated and time consuming techniques.

One of the two major techniques for fabrication of optical fibers is the so-called "soot deposition" process. Typically, in this process, glass precursor vapors are introduced into a hydrolyzing flame. The result is formation of adherent particulate material (i.e. soot) which is directed towards a mandrel upon which the soot adheres to form a soot preform. Following deposition, the soot preform is dehydrated and then consolidated into transparent fused silica. From a commercial standpoint this approach is desirable since the deposition rates are generally rapid. For example, a soot preform adequate for fabrication of a 20 kilometers of fiber may be prepared in a few hours. However, by virtue of the nature of the hydrolysis process there is formed impurities. Since formation takes place within a combustion environment contaminants are inevitable. One of the more troublesome is the hydroxyl radicals. These lead to light absorption peaks or zones in the fiber. Absorption, of course, leads to light loses during transmission.

For eliminating the hydroxyl material from the glass soot preform, the latter is subjected to a dehydrating process. Typically, dehydration occurs in a furnace heated to about 1000° C. and which contains a gaseous drying agent, such as chlorine. The glass soot preform is introduced into the furnace whereat it is heated uniformly and the chlorine passes through the preform and effects removal of the water related impurities. The vessel walls forming the furnace are made of, for example, quartz to prevent contamination and the gas pressure is such as to resist tube collapse. In practice, the same furnace is used to consolidate the soot preform into transparent glass. Consolidation requires higher temperatures, for instance, in the range of about 1400°–1700° C. These consolidating temperatures are at about temperatures that quartz furnace walls soften. Moreover, these walls are subject to the corrosive effects of the gases which are sometimes used. In practice these walls are replaced often. Replacement of worn or deformed quartz furnace walls is time consuming and expensive not only because quartz is expensive, but there is significant downtime associated with each replacement. These costs add significantly to the overall production costs of the fibers. Known attempts to minimize the detrimental effect of heat on the walls include conducting heat away from the walls. Representative examples of the soot deposition technique are disclosed in the following U.S. Pat. Nos.: 3,806,570; 4,440,558 and 4,402,720.

The other approach is the so-called inside vapor deposition process, wherein glass precursor vapors are passed through a glass tube heated to very high temperatures as by a plasma. Glass particulate or soot is produced within the heated tube and accumulates on the tube inside whereat it is consolidated. The vapors are not subjected to a hydrolyzing flame so that the impurities normally associated therewith are substantially eliminated. Nonetheless, it is significantly more time consuming than the soot deposition technique. From a commercial standpoint, therefore, it is less desirable. Representative examples of such techniques are disclosed in the following U.S. Pat. Nos.: 4,217,027; Re. 30,635; 4,405,655; 4,262,035; 4,331,462 and 4,292,063.

SUMMARY OF THE INVENTION

According to the present invention, there is provided a method of treating an article in a plasma. More specifically, there is provided a method of and apparatus for improving the fabrication of glass soot preforms for use in forming optical fibers.

In an illustrated embodiment, the method and apparatus consolidate the dehydrated glass soot preform. Towards that end, a heating zone is created by striking a plasma within a heating vessel. The soot preform, which has been dehydrated previously, is slowly introduced into the plasma so that the plasma is effective to transform the soot into transparent glass.

According to another embodiment, a glass soot preform is dehydrated in a vessel having a heating zone formed by a plasma, which plasma does not adversely thermally affect the vessel walls. Because the walls are not adversely thermally affected, a gaseous drying agent which reacts with the water impurities in the soot is maintainable at low pressures, such as partial vacuum.

Further in accordance with the present invention, there is a method of producing a substantially water-free glass preform comprising the steps of depositing a glass soot material on a forming surface followed by substantially simultaneously dehydrating and consolidating the preform in a vessel, wherein a plasma is struck in the vessel and the preform is slowly introduced into the plasma so as to substantially simultaneously effect dehydration and consolidation.

The present invention also envisions apparatus for carrying out the foregoing.

Among the objects of the present invention are, therefore, the provision of a method which heat treats an electrically non-conducting article in a plasma; the provision of a method of consolidating a glass soot preform by introduction thereof into the plasma; the provision of a method of striking a plasma within walls of a heat treating vessel so as not to adversely thermally effect the vessel walls; the provision of a method of dehydrating a glass soot preform in a low pressure environment; and the provision of a method of substantially simultaneously effecting dehydration and consolidation.

Other objects and further scope of applicability of the present invention will become apparent from the detailed description to follow when taken in conjunction with the accompanying drawings in which like parts are designated by like reference numerals throughout the several views.

DETAILED DESCRIPTION

Figure 1:
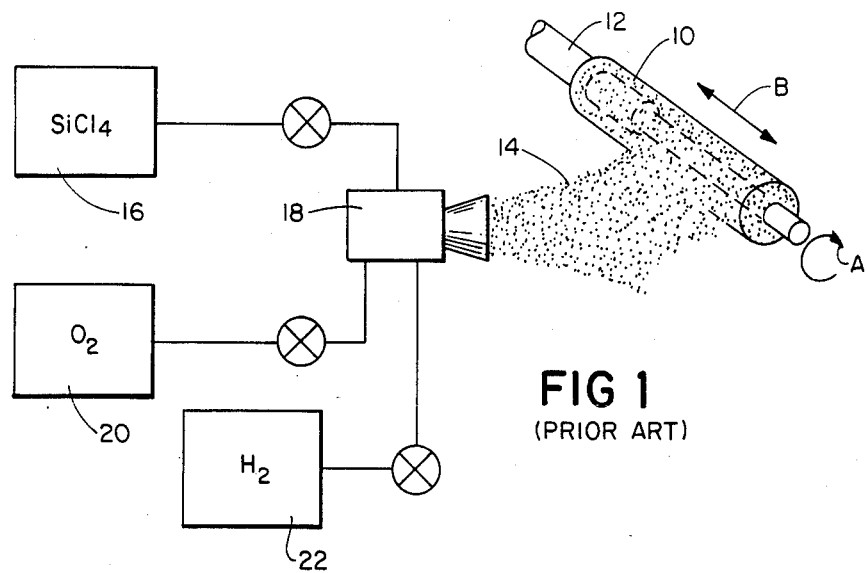
FIG. 1 is a diagrammatic view of a glass soot deposition technique.

FIG. 1 shows broadly an outside vapor deposition technique for forming a glass soot preform 10. The soot deposition technique does not, per se, form an aspect of the present invention. Therefore, a detailed description thereof will be dispensed with. Hence, only those aspects necessary for an understanding of the present invention will be set forth. The improved consolidation and dehydration techniques of this invention are intended for use in conjunction with glass soot preforms of the kind produced by the outside vapor deposition technique.

As is conventional in such a process, a mandrel 12 or forming surface is rotated in the direction of the arrow A and is reciprocated axially in the direction of the arrows B by known apparatus (not shown). As a result, soot or particulate 14, formed by flame hydrolysis is deposited generally uniformly over the mandrel 12. The mandrel 12 may be made of several different kinds of materials including, for example, silica or alumina; usually, however, silica is used. Whatever material is selected though, it should have a relatively low expansion rate with respect to the material of the glass soot particulate. In this case, the mandrel is made from silicon dioxide ($SiO_2$).

For forming the soot 14, a hydrolizable precursor vapor is used. In this regard for forming $SiO_2$ soot or a doped $SiO_2$ soot; $SiCl_4$; or $SiCl_4$ plus a dopant, such as a halide, are used; respectively. In this regard provision is made for a suitable source of the $SiCl_4$ indicated generally by reference numeral 16. For creating a flame (not shown) there is provided a burner 18 which mixes oxygen from source 20 with a combustible gas, such as hydrogen, from source 22 and the $SiCl_4$. As indicated previously, the burner 18 and the manner by which the soot 14 is formed is well known and will not, therefore, be discussed in detail. The burner flame is positioned close to the mandrel 12, for example, several inches away. As a result, the soot 14 may accumulate in the form of a glass soot preform 10 having a thickness of an inch or more without peeling or cracking.

Figure 2:
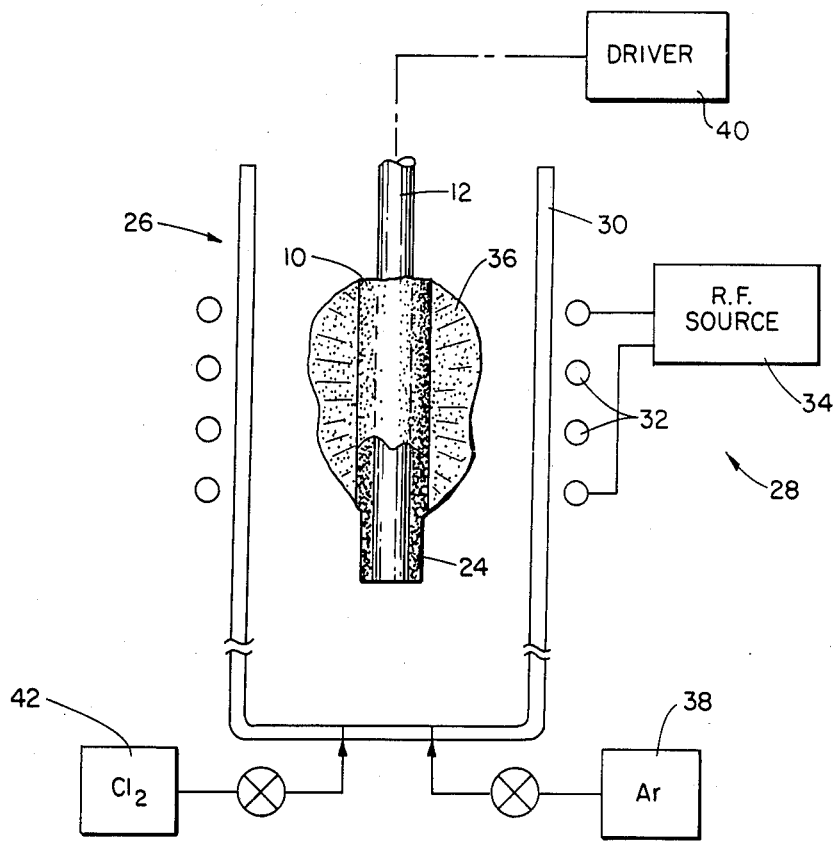
FIG. 2 is a diagrammatic view of a dehydrating and/or consolidating step.

FIG. 2 illustrates diagrammatically a furnace 26 which may be used for either dehydration and/or consolidation. The furnace 26 includes a plasma forming apparatus 28 and has vessel walls indicated generally at 30. Because of the present invention, the vessel walls 30 need not be fabricated from expensive quartz or other similar materials since they need not withstand the temperatures ordinarily necessary for fusing silica; for example, 1400° C. Since a plasma is struck inside the vessel, the walls must be made of a dielectric material having properties which permit formation of a plasma. Preferably, the walls 30 could be made of a material which has a high dielectric property as well as a high refractory material, such as alumina.

Reference is now made to the production of a plasma 36 within the furnace 26. Towards that end, an easily ionizable gaseous medium, susceptible to formation of plasma, is passed through the furnace 26. At this point in time, it should be mentioned that many details of the furance 26 have been omitted since they do not, per se, form an aspect of this invention. The furnace 26 is provided with suitable valves to permit the introduction and venting of the gases which are used as well as provides a suitable sealing function.

The gaseous medium used for a plasma fire-ball 36 can be oxygen and/or argon or even helium. In this embodiment, it is argon. Whether the gaseous medium is monotomic, diatomic, or polyatomic does not matter so long as it can form a plasma. It is preferable that the plasma forming gas be easily ionizable. In the present embodiment, argon from a source 38 is pumped through the furnace 26. Argon will, when excited by an alternating r.f. source 34, applied to the plasma induction coils 32, create a fire-ball 36 inside the vessel. The coils 32 surround the vessel walls 30 and are connected to a suitable generator or r.f. source 34. If desired, instead of an inductive plasma fire-ball, one can be induced by microwave.

In this embodiment, it is preferable to center the fire-ball 36 so that its periphery is away from the vessel walls 30. This allows for a much cooler wall during dehydrating and/or consolidating. Although the fire-ball 36 is centered, the present invention also contemplates having the plasma fire-ball 36 off-center so that the preform 10 can be rotated. In this manner, a portion of the preform 10 enters the plasma to allow consolidation. Also, the plasma can have a torroidal shape. During consolidation chlorine is present in a small amount so as to mop up or react with any OH liberated at the higher rempterature. Thus, the vessel is substantially filled with argon.

What is considered unexpected and surprising is the fact that the preform 10 can be introduced into the plasma fire-ball 36 without vaporizing. Since the temperature inside a plasma can be about 30,000° C., it was assumed that any article introduced thereinto would vaporize. However, it has been learned that an article which is essentially non-conductive electrically can be introduced into the center of a plasma without the former vaporizing. In this regard, the article must be of sufficient thermal capacity with respect to the plasma to prevent rapid heating that would lead to vaporization or uncontrolled melting of the article. In particular, it has been found that a glass soot preform 10 can be sintered into fused silica by placing the latter in the plasma. Apparently, vaporization does not occur because the soot preform displaces the plasma and heating then takes place by conduction from the surrounding plasma.

In this embodiment, for obtaining a fire-ball with a core temperature of about 30,000° C., the coils 32 are subject to an alternating electromagnetic field at a frequency of, for example, 5 KHz by a generator having ample power. At such frequency a ball-shaped plasma extending several inches in diameter is formed. The length and overall shape are controlled in conventional fashion as by suitably designed gas flow and the magnetic field of the coil. As noted, the periphery of the fire-ball is out-of-contact with the vessel walls 30. The nature of a plasma is such that there is a significant heat gradient from its center to its periphery. At the periphery, the temperature is roughly a few hundred degrees centigrade, whereas the center may be 30,000° C. Thus, the walls 30 are not subjected to intense temperatures such as 1400° C. Moreover, the walls 30 can be such as 1400° C. water cooled in a conventional manner. The use of the plasma tends to minimize distortion and etching of the furance walls. The water cooling also prevents distortion and minimizes etching. Although this embodiment discloses striking a plasma with a core temperature of 30,000° C., it is pointed out that other temperatures can be employed. These temperatures can be selected so long as they achieve the desired heating of the article. Therefore, the frequency and power to the coils can be varied accordingly.

For slowly lowering the glass soot preform 10 into and through the plasma there is provided a lowering mechanism or driver indicated generally by reference number 40. Details of such a lowering mechanism 40 do not, per se, form an aspect of the present invention, hence a detailed description is not given. The lowering mechanism 40 lowers the preform 10 and mandrel 12 into and through the plasma fire-ball 36 at a rate which allows completion of consolidation. For example, a rate of several millimeters per hour would be sufficient. Of course, the lowering rate is a function of several parameters including the material being sintered, and the sintering or consolidating temperature. Thus, the example given is for purposes of illustration and not limitation. During consolidation, the soot preform 10 is sintered at which time it consolidates or is fused into a transparent glass body 24. The soot preform 10 as a result of the consolidation shrinks. In this embodiment, the preform 10 has already been dehydrated to remove water-related impurities. Following consolidation, the fused silica 24 is withdrawn from the furnace 26, whereupon it may be subsequently drawn by conventional steps into an optical fiber.

Another aspect of the present invention concerns use of the plasma fire-ball 36 for dehydration. In such a process, the size, shape and temperature of the plasma is induced so that you can heat progressive sections of the glass soot preform 10 to a suitable dehydrating temperature which is below the sintering temperature, for example, about 1000° C. This occurs as the preform is gradually lowered through the plasma at a suitable rate. Other temperatures below the sintering temperature can, of course, be used. Towards this end, the plasma forming apparatus 28 is suitably adjusted so that the temperature of the fire-ball 36 is effectively lowered such that when the preform 10 is introduced thereinto, dehydration takes place, but not consolidation.

During dehydration, a partial vacuum can be used. Use of such low pressure can be used successfully. This is because through use of a plasma, the vessel walls 30 are not heated to such extreme temperatures that cause them to sag or collapse. It is believed that the partial vacuum within the vessel walls facilitates better temperature control. More specifically, by lowering the pressure of the partial vacuum the heating of the preform is proportionally lowered. Conversely, by raising the pressure of the partial vacuum environment, the heating of the preform is proportionally increased. In this embodiment, the drying agent used is chlorine which is supplied from a suitable source 42. Other suitable drying agents can be used. The amount of chlorine present in the furnace 26 is such as to thoroughly cooperate with the water impurities (e.g., hydroxyl material). In the dehydration process, argon is used not only for allowing striking of the plasma but also as an inert carrier gas carrying the chlorine into and through the glass soot. The resultant hydrochloric (HCl) vapor formed can be vented suitably from the furnace top by valve means not shown, but which are conventional. In such an embodiment, the pressure range of the gases within the vessel can be between, for example, 10 to 1000 Torr.

Although the benefits of better temperature control through the use of partial vacuum has been described in conjunction with a dehydration process, it will be appreciated that the same degree of temperature control can be achieved in the consolidation process.

It is also contemplated by this invention to substantially simultaneously dehydrate and consolidate the glass soot preform 10 within the furnace 26. This would be accomplished by subjecting the glass soot preform 10 to an environment using a drying agent as chlorine and a diluant carrier gas such as argon. The chlorine would be present in an amount which would serve to remove water impurities but without adversely affecting the preform. The argon would be present in an amount necessary for creating the plasma fire-ball 36 and for serving as a carrier gas. In this process, it is important that the preform 10 be lowered gradually into the plasma fire-ball 36. The reason for this is that the dehydration must be completed before actual sintering is accomplished. Otherwise trapped impurities result. Thus, while the present specification and claims recite that dehydration and consolidation occur substantially simultaneously it is to be understood that dehyrdation occurs first. In actuality dehydration can occur within a relatively short time frame, for example, less than thirty minutes. Consolidation can take several hours. By gradually introducing the preform 10 into the plasma fire-ball 36 the dehydration occurs before the preform is sintered. A rate of a few millimeters per hour would be considered adequate for accomplishing the above. In a preferred process, the pressure of the environment within the furnace would be low (e.g., 10 to 1000 Torr). This would, of course, facilitate significantly better temperature control of the preform 10, should the temperature be desired to change.

In this process, the temperature in the center of the plasma fire-ball 36 can be about 30,000° C. Other temperatures can be utilized provided, of course, they achieve the desired dehydration and consolidation. By slowly lowering the preform 10 into the fire-ball 36 the former experiences the temperature gradient of the fire-ball. It will be recalled that the fire-ball has gradually lower temperatures towards its periphery. Thus, the preform entering the periphery and travelling towards the center of the fire-ball will gradually heat up. Of course, such temperatures will be below the sintering temperature. Gradually, the temperature will reach a value suitable to effect dehydration. Further, since the preform is gradually inserted into the fire-ball, portions of the former are generally uniformly heated. Uniform heating enhances dehydration as well as consolidation.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. In a method for dehydrating and consolidating an elongated glass soot preform, the improvement comprising the steps of:

providing a vessel having interior glass walls defining a controllable environment;

drawing a partial vacuum within said vessel;

establishing a gaseous drying environment within said vessel under said partial vacuum condition;

striking a plasma within said vessel to develop temperatures within said plasma of about 30,000° C., the peripheral portions of said plasma being spaced from the interior walls of said vessel to restrict heating of said walls to on the order of several hundred degrees C so as not to have an adverse effect thereon; and passing the elongated glass soot preform through said plasma, one end first, at a predetermined rate of movement to displace said plasma about the preform and effect a progressive lengthwise substantially water-free consolidation thereof without preform volatization.

2. A method of consolidating a dehydrated glass soot preform comprising the steps of:

(a) creating a heating zone by striking a plasma to develop temperatures of about 30,000° C. within said plasma; and, (b) introducing the soot preform into the zone so as to displace said plasma about the preform and effect consolidation of the soot to form a transparent glass preform without preform volatization.

3. The method of claim 2 wherein relative movement is effected between the soot preform and the zone so as to progressively consolidate successive preselected lengths of the preform.

4. A method of consolidating a dehydrated glass soot preform comprising the steps of:

(a) creating a sintering zone in a vessel by striking a plasma spaced from the walls forming the vessel such that temperatures of the sintering zone within said plasma of about 30,000° C. while the walls forming the vessel are heated to only a few hundred degrees C so that the sintering zone does not adversely affect the walls forming the vessel; and, (b) introducing the soot preform into the sintering zone so as to displace said plasma about the preform and effect consolidation of the soot preform without preform volatization to form a transparent glass preform.

5. The method of claim 4 wherein the vessel wall is made of dielectric material.

6. The method of claim 5 wherein the plasma is struck in less than atmospheric pressure within the vessel, whereby changes in the pressure will proportionally effect changes in the temperatures of the article.

7. A method of dehydrating a glass soot preform in a vessel comprising the steps of:

(a) striking a plasma to form a heating zone in the vessel with temperatures of about 30,000° C., said plasma being spaced from the walls of the vessel such that the temperatures of the plasma do not adversely effect the walls of the vessel by excessive heating of the walls;

(b) introducing the glass soot preform in the heating zone so as to displace said plasma about the preform and generally uniformly heat the preform without preform volatization; and, (c) maintaining a gaseous drying agent in the vessel at less than atmospheric pressure whereby changes in the pressure will proportionally effect changes in the temperature of the article.

* * * * *